United States Patent [19]

Nagano

[11] Patent Number: 4,756,704
[45] Date of Patent: Jul. 12, 1988

[54] FRONT DERAILLEUR FOR A BICYCLE
[75] Inventor: Masashi Nagano, Izumi, Japan
[73] Assignee: Shimano Industrial Company Limited, Osaka, Japan
[21] Appl. No.: 67,228
[22] Filed: Jun. 29, 1987
[30] Foreign Application Priority Data Jul. 10, 1986 [JP] Japan ................. 61-106217

[51] Int. Cl.⁴ .............................................. F16H 7/18
[52] U.S. Cl. ........................................ 474/144; 474/82
[58] Field of Search .............................. 474/78–82, 474/144, 140

[56] References Cited

U.S. PATENT DOCUMENTS

| 4,030,374 | 6/1977 | Isobe | 474/82 |
| 4,194,409 | 3/1980 | Nagano | 474/80 |
| 4,237,743 | 12/1980 | Nagano | 474/82 |
| 4,330,137 | 5/1982 | Nagano | 280/238 |
| 4,551,121 | 11/1985 | Nagano | 474/80 X |

FOREIGN PATENT DOCUMENTS

| 0032049 | 7/1981 | European Pat. Off. |
| 57-39271 | 8/1982 | Japan |
| 610582 | 10/1948 | United Kingdom |
| 616877 | 1/1949 | United Kingdom |
| 1528977 | 10/1978 | United Kingdom |

Primary Examiner—Stephen J. Novosad
Assistant Examiner—Thuy M. Bui
Attorney, Agent, or Firm—Stevens, Davis, Miller & Mosher

[57] ABSTRACT

A front derailleur for a bicycle which is provided with a linkage mechanism formed of a fixing member, first and second linkage members, and a movable member. The first and second linkage members are pivotally supported through first and second pivot shafts to the fixing member. The first and second pivot shafts are each fixed at one axial end thereof to the fixing member and, pivotally support at intermediate thereof the linkage members respectively. The first and second pivot shafts are connected at their other axial ends by a connector, so that a load due to an operating force to operate the linkage mechanism is dispersed to the first and second pivot shafts, thereby enabling the front derailleur to be miniaturized and inexpensive to produce.

6 Claims, 2 Drawing Sheets

FRONT DERAILLEUR FOR A BICYCLE

FIELD OF THE INVENTION

The present invention relates to a front derailleur for a bicycle, and more particularly, to a front derailleur for a bicycle, which is provided with a linkage mechanism so that a control wire is operated to deform the linkage mechanism to shift a driving chain to one of two or more multistage front chain gears of different diameters.

BACKGROUND OF THE INVENTION

Generally, this kind of front derailleur, as disclosed in Japanese Utility Model Publication Gazette No. Sho 57-39,271, is provided with a linkage mechanism comprising a fixing member fixed to a seat tube of the bicycle frame, a pair of first and second linkage members connected to the fixing member through a pair of pivot shafts, and a movable member having a chain guide and connected to free ends of the linkage members through a pair of pivot shafts. The first linkage member is provided at its root portion with an integral operating arm for supporting a control wire, so that the control wire is operated to deform the linkage mechanism so as to move the chain guide axially of the multistage front chain gear assembly.

In the above-described construction, since the first linkage member is provided with the operating arm subjected to an operating force of the control wire, the pivot shaft for pivotally supporting the first linkage member to the fixing member is fully subjected to the operating force of the control wire. Therefore, as disclosed in Japanese Utility Model Publication Gezette No. Sho 57-39,271, at a pivot portion of the first linkage member to the pivot shaft are provided a recess and a pair of mounting members having through bores, with the operating arm being integral with one of the mounting members. At the fixing member is provided a projecting mounting base to be fitted into the recess, so that the mounting base is fitted into the recess and the pivot shaft is fitted into the through bores and supported at an intermediate portion to the fixing member. Also, the mounting members at the first linkage member are supported to both ends of the pivot shaft to form a double end support construction is capable of withstanding a heavy load.

In such conventional construction, however, it is necessary to particularly form by cutting-processing the recess at the first linkage member and the mounting base at the fixing member, thereby creating a problem in that the processing is complicated resulting in high manufacturing costs. Since the operating arm is integral with one mounting member, the mounting member must be larger in thickness to increase its strength, thereby giving a poor appearance to that extent.

In order to pivotally support the first linkage member having the operating arm to the fixing member through the pivot shaft, it is considered that, for example, the pivot shaft is fixed at one axial end to the fixing member and pivotally supports the first linkage member. In this case, since the first linkage member is supported to the pivot shaft of cantilever construction, the pivot shaft is required to be larger in diameter from the viewpoint of strength, whereby a base of the first linkage member and the pivot shaft fixing portion at the fixing member are large in size to result in an unbalanced design for the entire derailleur.

SUMMARY OF THE INVENTION

An object of the invention is to provide a front derailleur for a bicycle, which connects a first linkage member provided with an operating arm to a fixing member through a pivot shaft in cantilever fashion and can increase the pivotal strength of the first linkage member without using a large diameter pivot shaft while still maintaining a good appearance.

The front derailleur of the invnetion is provided with a linkage mechanism comprising a fixing member, first and second linkage members connected thereto by first and second pivot shafts respectively, and a movable member having a chain guide and connected to the free ends of the linkage members through third and fourth pivot shafts. The first linkage member is provided with an operating arm mainly supporting a control wire so that the control wire is operated to deform the linkage mechanism, thereby moving the chain guide axially of the multistage front chain gear assembly. In such front derailleur, the first and second pivot shafts are constructed as follows:

The first and second pivot shafts are provided (1) at one axial end thereof with fixing portions and are fixed therethrough to the fixing member respectively, (2) at intermediate portions with pivot portions which pivotally support the linkage members respectively, and (3) at their other axial ends with projection shaft portions projecting outwardly from the linkage members respectively. A connector is provided across the projecting shaft portions of the first and second pivot shafts to connect them together.

Accordingly, the present invention constructed as described above yields the following working results A load due to an operating force applied from the first linkage member having the operating arm is dispersed to the first and second pivot shafts through the connector and then applied to the fixing member. Hence, while the first pivot shaft is supported in cantilever fashion with respect to the fixing member, the strength of connecting the first pivot shaft with the first linkage member can be increased without increasing the diameter of the first pivot shaft, and also the connector covers the pivot shafts to give a good appearance.

The connector is formed preferably of a plate member and connects the projection shaft portions preferably by using screw means. In this embodiment, the projection shaft portions are provided with screw threads respectively, the connector is provided with threaded bores to screwably connect with the projection shaft portions, in which the threaded bores are preferably blind, thereby further giving a better appearance. In this embodiment, the first and second pivot shafts are preferably caulked to the fixing member.

Furthermore, the present invention provides a novel regulation means to regulate a range of swinging motion of the linkage mechanism, in other words, the linkage members, by use of adjusting bolts.

Generally, the regulation means for the linkage members by the adjusting bolts are exposed to the exterior, whereby mud splashed by rotation of the bicycle wheel is attached to the adjusting bolts and contact portions therewith, thus creating a problem in that a range of swinging motion of each linkage member to be regulated by the adjusting bolt may become improper to field deteriorated speed change efficiency and further that a driving chain may disengage from the front chain gear. Hence, in order to solve such problems, a cavity is provided at the first linkage member, the utmost ends of the adjusting bolts extend into the cavity, and the fixing member is provided with a projection which enters into the cavity and has contact portions which contact against the adjusting bolts respectively, thereby regulating in the cavity the range of swinging motion of the linkage member.

In addition, the cavity is open at the surface of the first linkage member opposite to the fixing member. When the first linkage member is pivoted to the fixing member through the pivot shaft, the cavity is closed by the fixing member. In this case, a sealing member is provided between the opposite surfaces of the first linkage member and the fixing member, thereby closing the cavity to further ensure solution of the aforesaid problem.

These and other objects of the invention will be apparent by reference to the following description, taken in connection with the accompanying drawings.

DETAILED DESCRIPTION OF THE INVENTION

Figure 3:
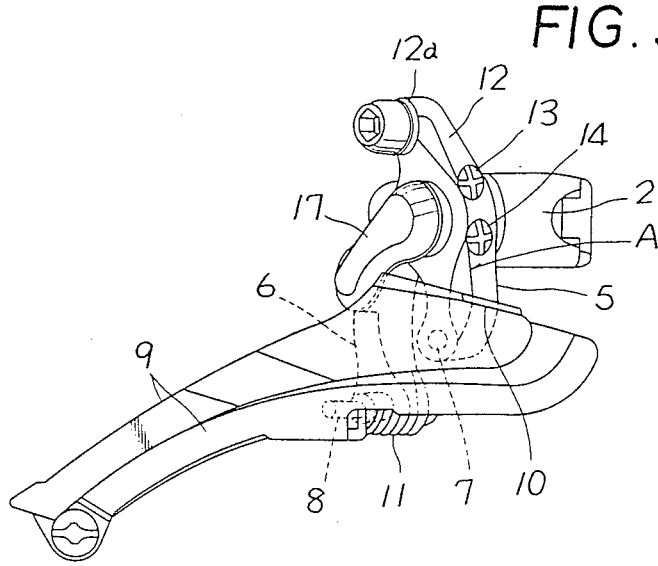
FIG. 3 is a front view of an entire front derailleur.
Figure 4:
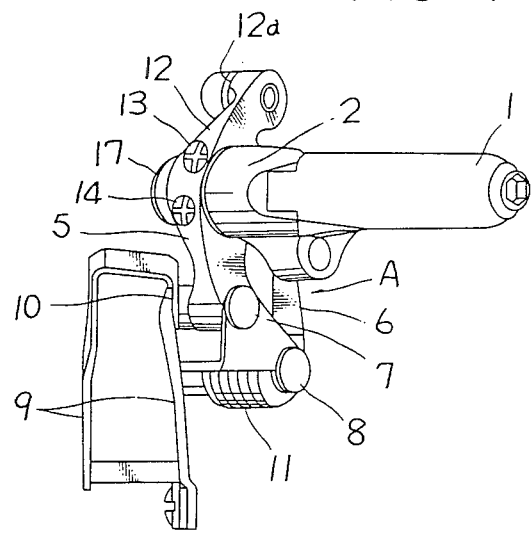
FIG. 4 is a side view of an entire front derailleur.
Figure 5:
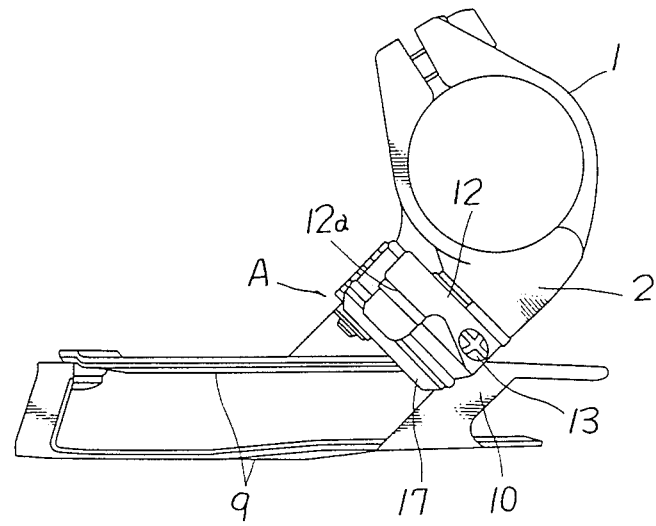
FIG. 5 is a plan view of the same.

A front derailleur shown in FIGS. 3 through 5 is provided with a linkage mechanism A comprising a fixing member 2 fixed to a seat tube at the bicycle through a tightening band 1, a pair of first and second linkage members 5 and 6 pivotally supported to the fixing member 2 through first and second pivot shafts 3 and 4, and a movable member 10 having a chain guide 9 and connected to free ends of the linkage members 5 and 6 through third and fourth pivot shafts 7 and 8; a return spring 11 interposed between the second linkage member 6 and the movable member 10 so as to bias the chain guide 9 toward a smaller diameter chain gear of a multistage front chain gear assembly (not shown); and an operating arm 12 integrally formed at the root of the first linkage member 5 and having a support 12a supporting a control wire of a control cable which comprises (1) the control wire and (2) an outer sheath for guiding the wire, so that the control wire is pulled to deform the linkage mechanism A to move the chain guide 9 axially toward a larger diameter chain gear at the multistage front chain gear assembly, and the control wire is loosened to return the chain guide 9 by a restoring force of the return spring 11 toward the smaller diameter chain gear.

Figure 1:
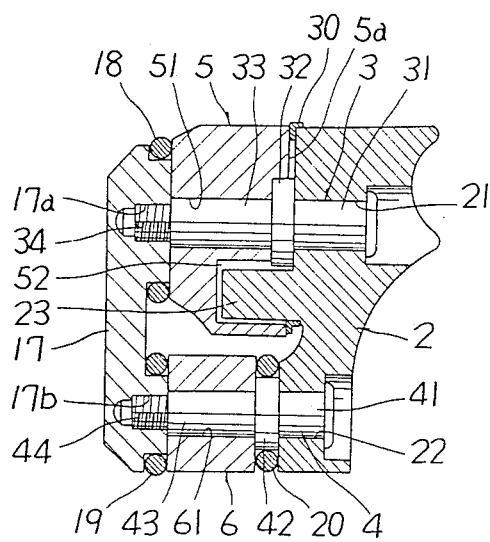
FIG. 1 is an enlarged plan view of the principal portion of an embodiment of the invention.

In an embodiment of a front derailleur of the invention, the first and second pivot shafts 3 and 4 shown in FIG. 1 are constructed as follows.

The first and second pivot shafts 3 and 4 are provided at one axial end thereof with fixing portions 31 and 41 to be fixed to the fixing member 2, at intermediate portions with flanges 32 and 42 and pivot portions 33 and 43 on which the first and second linkage members 5 and 6 are pivotally supported, and at their other axial end with projection shaft portions 34 and 44 projecting from the linkage members 5 and 6 when pivotally supported on the pivot portions 33 and 43 respectively. The first and second pivot shafts 3 and 4 are fixed at the fixing portions 31 and 41 to the fixing member 2, the linkage members 5 and 6 are pivotally supported onto the pivot portions 33 and 43, and a connector 17 for connecting the projection shaft portions 34 and 44 is provided across them.

The fixing member 2 is provided with mounting bores 21 and 22 into which the fixing portions 31 and 41 of pivot shafts 3 and 4 are fitted respectively. Fixing portions 31 and 41 are larger in length than the mounting bores 21 and 22 and fixed to the fixing member 2 preferably by caulking.

The linkage members 5 and 6 are provided with through-shaft-bores 51 and 61 through which the pivot portions 33 and 43 at the pivot shafts 3 and 4 are fitted to be pivotally supported.

The connector 17 is composed preferably of a plate member and is coupled with the projection shaft portions 34 and 44 preferably by screw means.

In this embodiment, the projection shaft portions 34 and 44 are provided with screw threads and the connector with threaded bores 17a and 17b respectively as shown in FIG. 1. In this case, when the threaded bores 17a and 17b are made blind, the pivot shafts 3 and 4 are covered as shown in FIG. 3, thereby further giving a good appearance.

In order to incorporate the pivot shafts 3 and 4 in the front derailleur as shown in FIG. 1, the pivot portions 33 and 43 at the pivot shafts 3 and 4 are first fitted into the shaft bores 51 and 61 at the linkage members 5 and 6. Thereafter the connector 17 is disposed outside the linkage members 5 and 6 to set the threaded bores 17a and 17b to the projection shaft portions 34 and 44 respectively, and the pivot shafts 3 and 4 screw with the connector 17 by rotating the fixing portions 31 and 41, thereby fixing the connector 17 to the pivot shafts 3 and 4.

Then, the fixing portions 31 and 41 at the pivot shafts 3 and 4 are fitted into the mounting bores 21 and 22 and fixed to the fixing member 2 by caulking respectively.

Since the pivot shafts 3 and 4 are provided with the flanges 32 and 42, when the fixing portions 31 and 41 are caulked, an axial length of each pivot shaft 33 or 43 can be compensated regardless of the caulking, thereby enabling the linkage members 5 and 6 to be always properly swung.

Figure 2:
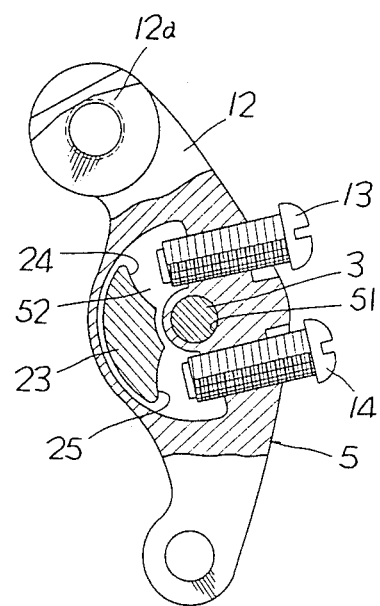
FIG. 2 is a partial cutaway enlarged front view of a first linkage member.

The first linkage member 5, as shown in FIG. 2, is provided with adjusting bolts 13 and 14 for regulating a range of the swinging motion of each linkage member 5 or 6.

In detail, the first linkage member 5 is provided around the shaft bore 51 receiving therein the first pivot shaft 3 with a semicircular cavity 52 open at the surface of the first linkage member 5 opposite to the fixing member 2, the adjusting bolts 13 and 14 entering at the utmost ends thereof into the cavity 52.

The fixing member 2, as shown in FIGS. 1 and 2, is provided with a protuberance 23 entering into the cavity 52 and having contact portions 24 and 25 opposite to the adjusting bolts 13 and 14 respectively.

When the control wire is pulled to deform the linkage mechanism A, one adjusting bolt 13 or 14 approaches one protuberance 24 or 25 to contact therewith, thereby regulating the deformation of linkage mechanism A, that is, the range of swinging motion of the first linkage member 5. Thus, the adjusting bolts 13 and 14 are adjusted to regulate the range of swinging motion of the first linkage member 5, in other words, the range of movement of the chain guide 9.

In the aforesaid construction, the cavity 52 is closed by the fixing member 2 when the first linkage member 5 is pivotally supported on the first pivot shaft 3, so that even when mud splashed by the bicycle wheel is attached to the linkage mechanism A, there is no risk that the mud will enter cavity 52 to cause an improper swinging motion due to attachment of the mud onto the utmost ends of adjusting bolts 13 and 14. Hence, the linkage members 5 and 6 can be accurately regulated with respect to their swinging motion within a range adjusted by the adjusting bolts 13 and 14.

In addition, as shown in FIG. 1, between the opposite surfaces of the first linkage member 5 and the fixing member 2 is provided a sealing member 20, 30 of, for example, synthetic resin, thereby sealing the cavity 52 and further preventing the mud from entering into the cavity 52.

Since the cavity 52 is provided at the first linkage member 5, there is no need of providing a particular member for covering the adjusting bolts 13 and 14 and contact portions 24 and 25. Hence, the front derailleur of the invention has the advantage of simplifying its construction while it is capable of obtaining the above-described results.

In addition, in FIG. 1, reference numerals 18, 19 and 20 designate O-rings respectively.

In the front derailleur of the present invention constructed as described above, when the control wire is pulled to deform the linkage mechanism A to move the chain guide 9 axially of the multistage front chain gear assembly, a load caused by an operating force applied to the first pivot shaft 3 from the operating arm 12 through the root of the first linkage member 5 is transmitted to the first pivot shaft 3 and simultaneously to the second pivot shaft 4 through the connector 17, thereby acting on the fixing member 2 through the two pivot shafts 3 and 4. Therefore, the load is dispersed, whereby the pivotal strength of the first linkage member 5 can increase even without enlarging a diameter of the pivot shaft 3. Also, since the first pivot shaft 3 need not be increased in diameter, the portions of the first linkage member 5 and fixing member 2 around the first pivot shaft 3 can be small in size so as to give a good appearance.

Furthermore, at the root of the first linkage member 5, the shaft bore 51 for inserting therein the first pivot shaft 3 need only be provided and the fixing member 2 need only be provided with the mounting bore 21, whereby the first linkage member 5 is very simple in construction to facilitate the processing of first linkage member 5 and fixing member 2 and lower the manufacturing cost to that extent. Also, the blind bores 17a and 17b provided at the connector 17 prevent free ends of the respective shafts 3 and 4 from being exposed to the exterior, thereby further giving a good appearance.

In addition, in FIG. 3, the linkage member 5 at the right-hand side is designated as the first linkage member and linkage member 6 at the left-hand side as the second one, but they may alternatively be designated vice versa since this is purely for the sake of facilitating description.

Neither the fixing means provided by caulking the roots of the pivot shafts 3 and 4 to the fixing member 2 nor the connecting means comprising connecting the connector 17 with the respective pivot shafts 3 and 4 in the above-described embodiment is particularly defined or limited to the above disclosure since alternative fixing means would be readily apparent to those skilled in the art.

While an embodiment of the invention has been shown and described above, the invention is not limited to the specific construction thereof, which is merely exemplary rather then is defined or limited.

What is claimed is:

1. A front derailleur for a bicycle, comprising a linkage mechanism comprising (i) a fixing member, (ii) first and second linkage members pivotally supported to said fixing member, (iii) first and second pivot shafts through which said first and second linkage members are pivotally supported to said fixing member, (iv) a movable member pivotally supported to said linkage members and carrying a chain guide, and (v) third and fourth pivot shafts through which said linkage members are pivotally supported to said movable member; said first linkage member comprising an operating arm for deformably operating said linkage mechanism; said first and second pivot shafts being provided (i) at one axial end thereof with fixing portions at which they are fixed to said fixing member respectively, (ii) at intermediate portions with pivot portions for pivotally supporting said first and second linkage members respectively, and (iii) at their other axial end with projection shaft portions projecting outwardly through said first and second linkage members which are pivotally supported to said pivot portions respectively; and a connector coupled across said projection shaft portions to thereby connect said first pivot shaft and said second pivot shaft.

2. A front derailleur for a bicycle according to claim 1, wherein said projection shaft portions are each provided with screw threads, said connector is provided with threaded bores, said projection shaft portions being screwably connected with said threaded bores respectively, thereby coupling said connector with said first and second pivot shafts.

3. A front derailleur for a bicycle according to claim 2, wherein said threaded bores are blind, so that said first and second pivot shafts screwing with said threaded bores are concealed by said connector.

4. A front derailleur for a bicycle according to claim 1, wherein said first linkage member comprises a pair of adjusting bolts and a cavity into which said adjusting bolts project, said fixing member including a protuberance which extends into said cavity and has a pair of contact portions opposite to said adjusting bolts respectively.

5. A front derailleur for a bicycle according to claim 4, wherein said cavity is open at a surface of said first linkage member which is opposite to said fixing member and is closed with said fixing member.

6. A front derailleur for a bicycle according to claim 5, wherein a sealing member for closing said cavity is provided between said first linkage member and said fixing member.

* * * * *